United States Patent
Batarseh

(10) Patent No.: US 12,122,096 B2
(45) Date of Patent: Oct. 22, 2024

(54) PROTOTYPE QUALITY IMPROVEMENT OF FDM 3D PRINTER

(71) Applicant: SAUDI ARABIAN OIL COMPANY, Dhahran (SA)

(72) Inventor: Sameeh Issa Batarseh, Dhahran Hills (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 283 days.

(21) Appl. No.: 17/647,896

(22) Filed: Jan. 13, 2022

(65) Prior Publication Data

US 2023/0219295 A1    Jul. 13, 2023

(51) Int. Cl.
| | | |
|---|---|---|
| *B29C 64/209* | (2017.01) | |
| *B29C 64/118* | (2017.01) | |
| *B33Y 10/00* | (2015.01) | |
| *B33Y 30/00* | (2015.01) | |
| *B29K 101/12* | (2006.01) | |

(52) U.S. Cl.
CPC .......... *B29C 64/209* (2017.08); *B29C 64/118* (2017.08); *B33Y 10/00* (2014.12); *B33Y 30/00* (2014.12); *B29K 2101/12* (2013.01)

(58) Field of Classification Search
CPC ... B29C 64/209; B29C 64/118; B29C 64/205; B29C 64/307; B29C 64/314; B29C 64/295; B29C 64/321; B33Y 10/00; B33Y 30/00; B33Y 40/00; B33Y 40/10
See application file for complete search history.

(56) References Cited

U.S. PATENT DOCUMENTS

| | | | |
|---|---|---|---|
| 10,518,472 B2 | 12/2019 | Larson et al. | |
| 2014/0158802 A1* | 6/2014 | Batchelder | B29C 64/321 242/157 R |
| 2017/0157855 A1* | 6/2017 | Larson | B29C 64/336 |
| 2019/0176401 A1* | 6/2019 | Fischer | B33Y 40/00 |
| 2019/0330766 A1* | 10/2019 | Steibel, Jr. | D01F 1/00 |
| 2020/0031048 A1* | 1/2020 | Stubbs | B29C 64/205 |

FOREIGN PATENT DOCUMENTS

| | | |
|---|---|---|
| CN | 211194944 U | 8/2020 |
| DE | 20 2017 101 571 U1 | 3/2018 |
| EP | 3 851 781 A1 | 7/2021 |
| KR | 2017-0081513 A | 7/2017 |

* cited by examiner

*Primary Examiner* — Philip C Tucker
*Assistant Examiner* — Andrew L Swanson
(74) *Attorney, Agent, or Firm* — Osha Bergman Watanabe & Burton LLP

(57) ABSTRACT

A heater includes an energy source, a heating element connected to the energy source via an electric heating cable, a moisture collector positioned proximate a first axial side of the heating element, and a housing holding the heating element and the moisture collector in an axially spaced apart configuration. The moisture collector includes a wall and a filament opening encircled by and defined by the wall.

10 Claims, 5 Drawing Sheets

PROTOTYPE QUALITY IMPROVEMENT OF FDM 3D PRINTER

BACKGROUND

Advanced tools, prototypes, and parts are often manufactured using three-dimensional (3D) printing (sometimes synonymously referred to as additive manufacturing). 3D printers may create 3D objects from a digital 3D model of the object (e.g., a computer aided design (CAD) model) by successively adding material layer by layer in the shape of the modeled object. Different materials may be used to print the 3D model, depending on the object being printed and the type of 3D printer being used. For example, some 3D printers use lasers to cure a liquid resin deposit into hardened plastic, and some 3D printers use a combination of deposited binder material and hard material that are fused together.

Fused deposition modeling (FDM) is a common 3D printing method that uses a continuous filament of printing material (e.g., a thermoplastic material) that is fed to a heated printer extruder head to be deposited layer by layer in the shape of the 3D object being printed.

FIG. 1 shows a simplified diagram of a typical FDM printer 10 and its main components. The FDM printer 10 includes a main body 12 of the printer, which may hold components for moving and operating a printer extruder head 14. A printing material may be provided as a filament 16 from a filament spool 18. The filament 16 may be fed from the filament spool 18 to the printer extruder head 14. The printer extruder head 14 heats the filament 16 and extrudes the heated filament 16 through a nozzle end of the printer head to deposit the heated filament 16 on a working plate 11. A computer-controlled motor and/or other equipment may move the printer extruder head 14 in two dimensions along a horizontal plane to deposit a layer of the filament material in accordance with a cross-sectional shape of a 3D model of the object being printed. Multiple layers may be successively deposited in the same manner to build the 3D object.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to heaters that may include an energy source, a heating element connected to the energy source via an electric heating cable, a moisture collector positioned proximate a first axial side of the heating element, and a housing holding the heating element and the moisture collector in an axially spaced apart configuration. The moisture collector may include a wall and a filament opening encircled by and defined by the wall.

In another aspect, embodiments disclosed herein relate to 3D printers that include a printer body, a printer head movably held within the printer body, a filament source, and a heater positioned on the printer body between the filament source and the printer head. The heater may include a housing, a heating element held within the housing, a moisture collector held within the housing, wherein the moisture collector comprises a wall encircling and defining a filament opening, and a filament path extending along a longitudinal axis of the housing, through the moisture collector, and proximate to the heating element, wherein the heating element and the moisture collector may be held in an axially spaced apart configuration along the longitudinal axis of the housing. A filament may be extended from the filament source, through the filament path in the heater, and to the printer head.

In yet another aspect, embodiments disclosed herein relate to methods using a heater on a body of a 3D printer, wherein the heater may include multiple heating elements held within a housing, multiple moisture collectors held within the housing, and a filament path extending along a longitudinal axis of the housing and through the multiple heating elements and the multiple moisture collectors, wherein the multiple heating elements and the multiple moisture collectors are held in an axially spaced apart configuration along the longitudinal axis of the housing. The methods may include moving a filament through the filament path, heating the filament with the multiple heating elements to a temperature less than a melting temperature of the filament to provide a heated filament, wiping moisture from the heated filament with the multiple moisture collectors, and directing the heated filament to a printer head of the 3D printer.

Other aspects and advantages of the claimed subject matter will be apparent from the following description and the appended claims.

DETAILED DESCRIPTION

Figure 1:
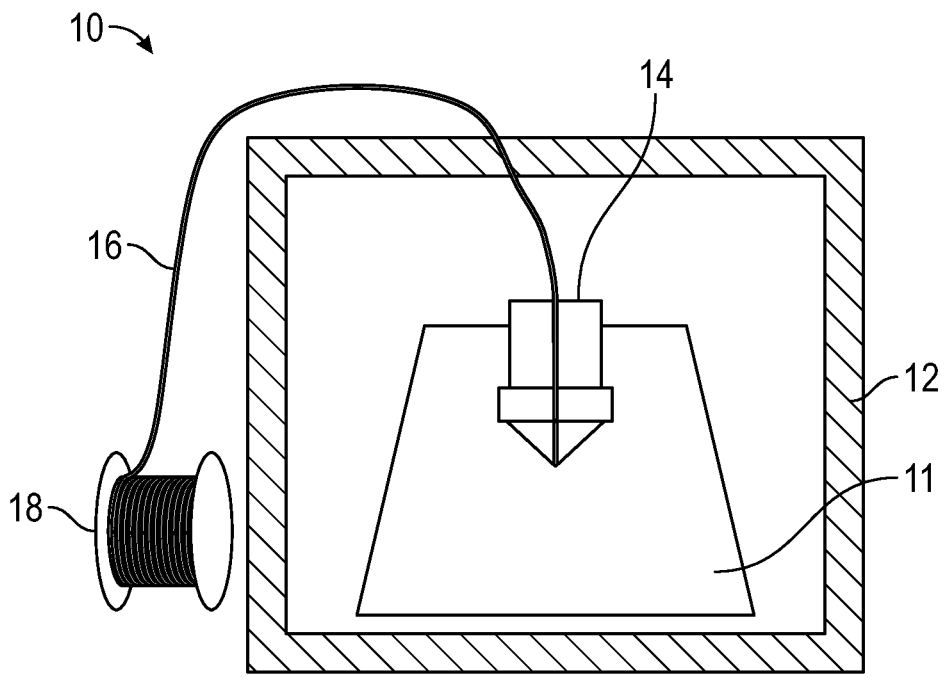
FIG. 1 is a simplified diagram of a conventional FDM printer.

Embodiments of the present disclosure are described below in detail with reference to the accompanying figures. In the following detailed description, numerous specific details are set forth in order to provide a more thorough understanding of the claimed subject matter. However, it will be apparent to one having ordinary skill in the art that the embodiments described may be practiced without these specific details. In other instances, well-known features have not been described in detail to avoid unnecessarily complicating the description. In the description of the figures, like reference numerals are used to refer to like elements.

Embodiments disclosed herein generally relate to methods and apparatuses for removing moisture around a 3D printer filament prior to 3D printing the filament. By reducing humidity around a 3D printer filament (drying the filament) prior to feeding the filament to the printer head, embodiments disclosed herein may improve the quality of the 3D printed material. For example, the quality of printed materials from a 3D printer may depend on several factors, such as filament quality, the printer type (including heating techniques used to heat the filament as it is extruded), and humidity. Humidity around a filament being 3D printed may affect the material properties of the filament, and thus also affect the printing process and the resulting printed object. Examples of printing failures due to humidity around the filament include variation in the filament properties, variation in the extrusion rate and flow from the 3D printer, breaks or weakness in the 3D printed model from adhesion issues with using humid filament, breaks in the filament prior to being printed, and problems with the printed material sticking to a working surface.

According to embodiments of the present disclosure, a heater may be used to dry (reduce the amount of moisture around) a filament prior to being extruded through a 3D printer head in order to improve the quality of the 3D printed object. Heaters according to embodiments of the present disclosure may be designed and made compact enough to fit on the 3D printer, such that a filament may be dried through the heater shortly before being extruded through the printer head (e.g., as the filament is being moved from the filament source to the printer head).

Figure 2:
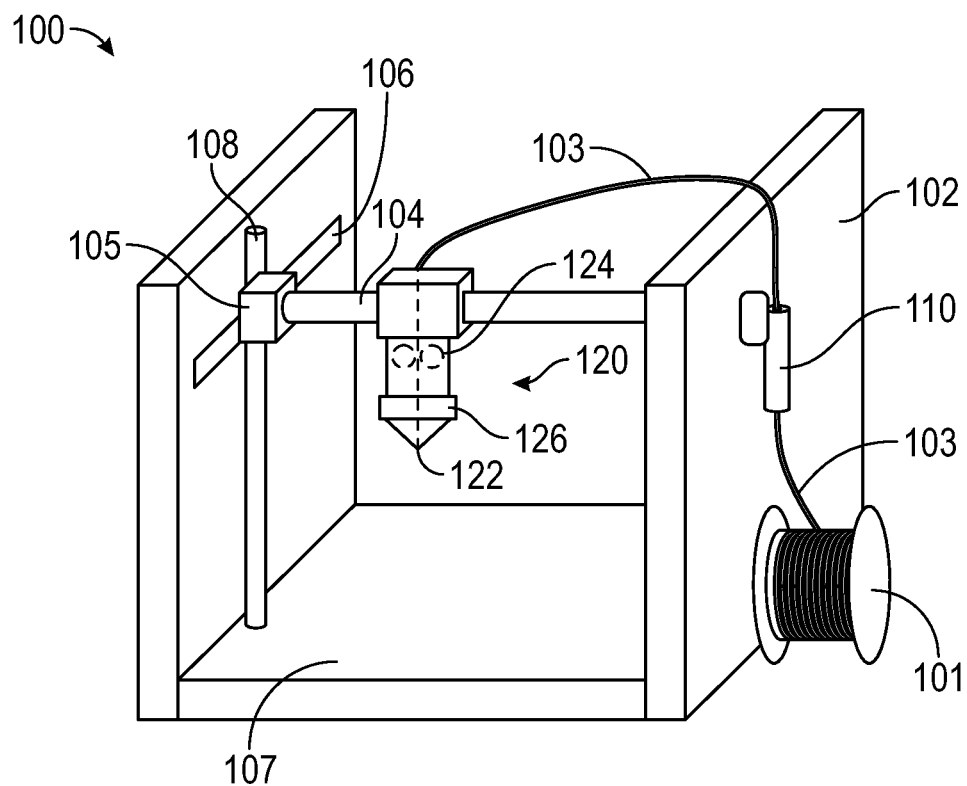
FIG. 2 shows a heater according to embodiments of the present disclosure mounted to a 3D printer.

For example, FIG. 2 shows a simplified drawing a 3D printer 100 having a heater 110 according to embodiments of the present disclosure mounted to the 3D printer 100. Heaters 110 according to embodiments of the present disclosure may be mounted to and used with numerous types of 3D printers (e.g., an FDM printer) utilizing a filament fed from a filament source (e.g., a spool of filament) to the printer head, where the filament may be extruded from the printer head to build a 3D structure. An example type of 3D printer 100 is shown in FIG. 2 to better explain how heaters according to embodiments of the present disclosure may be mounted to and operated with 3D printers.

As shown in FIG. 2, a 3D printer 100 may include a printer body 102. The printer body 102 may have a framed structure, which may hold different directional tracks 104, 106, 108. A printer head 120 may be moved with respect to the tracks 104, 106, 108 using at least one motor 105 (e.g., an electrically powered motor). The tracks 104, 105, 108 may be held in generally perpendicular orientations within the printer body 102, such that the printer head 120 may be moved three dimensionally along the axes formed by the orientations of the tracks. For example, the printer head 120 may be moved in an x-axis direction along a first track 104. The first track 104 and attached printer head 120 may be moved in a y-axis direction along a second track 106. The first and second tracks 104, 106 and the connected printer head 120 may be moved in a z-axis direction along a third track 108. In such manner, the printer head 120 may be three dimensionally moved along an x-y-z coordinate system using the tracks 104, 106, 108. However, other tracked technologies and configurations may be used to three dimensionally move a printer head 120 of a 3D printer 100 to build a 3D structure.

A filament source 101 (e.g., a spool of filament) may be mounted to the 3D printer 100 or held in a position proximate to the 3D printer 100. Filament 103 may be fed from the filament source 101, through a heater 110 according to embodiments of the present disclosure, and to the printer head 120. A filament 103 may be a long, flexible, thread-like strand of polymer material, such as acrylonitrile butadiene styrene (ABS), polylactic acid (PLA), polyethylene terephthalate (PET), nylon, thermoplastic elastomers (TPE), thermoplastic polyurethane (TPU), polymer composite materials, polystyrene, poly(vinyl alcohol) (PVA), polycarbonate, acrylonitrile styrene acrylate (ASA), polypropylene (PP), polyoxymethylene (POM), and other thermoplastic materials.

As the filament 103 is directed through a heater 110 according to embodiments of the present disclosure, the heater 110 may heat the filament to a temperature less than a melting temperature of the filament or less than a glass transition temperature of the filament. For example, depending on the filament material being used, the heater 110 may heat to a temperature ranging between 60 and 70° C. The heat from heater 110 may dry the filament 103 by removing moisture from around the filament by condensation and wiping away the condensed moisture from the filament 103 as the filament 103 is moved through the heater 110.

When the filament 103 is moved through the printer head 120, the printer head 120 may heat the filament 103 above the filament material's glass transition temperature and extrude the heated filament through a nozzle 122 in the printer head 120. For example, an extruder 124 in the printer head 120 may include rollers or other gripping mechanism that may pinch the filament and move the filament forward through (or backward from) the nozzle 122 in precise amounts. The printer head 120 may also include one or more heating mechanisms 126, such as induction heating coils, resistance heating elements, and other known heating elements. One or more heating mechanisms 126 may be positioned around a filament path through the printer head 120, such that as the filament 103 is extruded through the filament path in the printer head 120, the heating mechanism (s) 126 may heat the filament 103. For example, the heating mechanism 126 may heat the filament 103 to a rubbery or flowable state, such that the filament material may be deposited from the printer heat 120 onto a working surface in the printer 100.

For example, in a 3D printing process, filament 103 may be directed through a heater 110 according to embodiments of the present disclosure and then to a printer head 120. The printer head 120 may heat and extrude the filament material in small precise amounts onto a working surface 107 in the printer 100 in a first layer pattern according to a first layer cross-section of a 3D model (which may be generated by a computer aided software program). After depositing the first layer of filament material, the printer head 120 may deposit a second layer pattern according to a second layer cross-section of the 3D model. Additional layers of filament material may be sequentially deposited, one on top of the other, until a 3D object is built according to the 3D model.

Objects that may be built using a 3D printer (e.g., a FDM printer) may include, for example, advanced tools, prototypes, manufacturing parts, and other objects having complex shapes. 3D printers may be used to build different and unique designs quickly using different filament materials. The quality of the 3D printed objects may depend on several factors, such as filament quality, printer type and set up, and humidity. For example, humidity on the filament may damage the resulting 3D printed object, or even prevent the print. Previously used solutions to dry out filaments (and prevent humidity in the 3D printing process) were to store filaments in containers with dehumidifiers, which were bulky and required power supplies and maintenance. However, filaments stored with dehumidifiers are still able to pick up humidity as the filament travels from the dehumidifier container to the printer (e.g., especially in humid regions) and negatively affect the 3D printing process.

By using heaters 110 according to embodiments of the present disclosure, a filament 103 may be dried immediately before being extruded through a printer head 120 for 3D printing. For example, heaters 110 according to embodiments of the present disclosure may be small and compact enough to be positioned proximate the printer head 120, e.g., on a side wall of a 3D printer, or even on an extension part of the printer head.

According to embodiments of the present disclosure, a heater may include a housing holding at least one heating element and at least one moisture collector in an axially stacked configuration (e.g., where the components are stacked and adjacent to each other and/or where the components stacked in a spaced apart configuration). For example, heating element(s) and moisture collector(s) may be held in an axially spaced apart configuration along the longitudinal axis of the housing. A moisture collector may be made of a wall encircling and defining a filament opening. When the heater is assembled, the heater may have a filament path extending along a longitudinal axis of the housing, through the moisture collector(s), and proximate to the heating element(s), where the filament opening(s) in the moisture collector(s) form part of the filament path through the heater. A filament may extend from a filament source, through the filament path in the heater, and to a printer head to be 3D printed.

Figure 3:
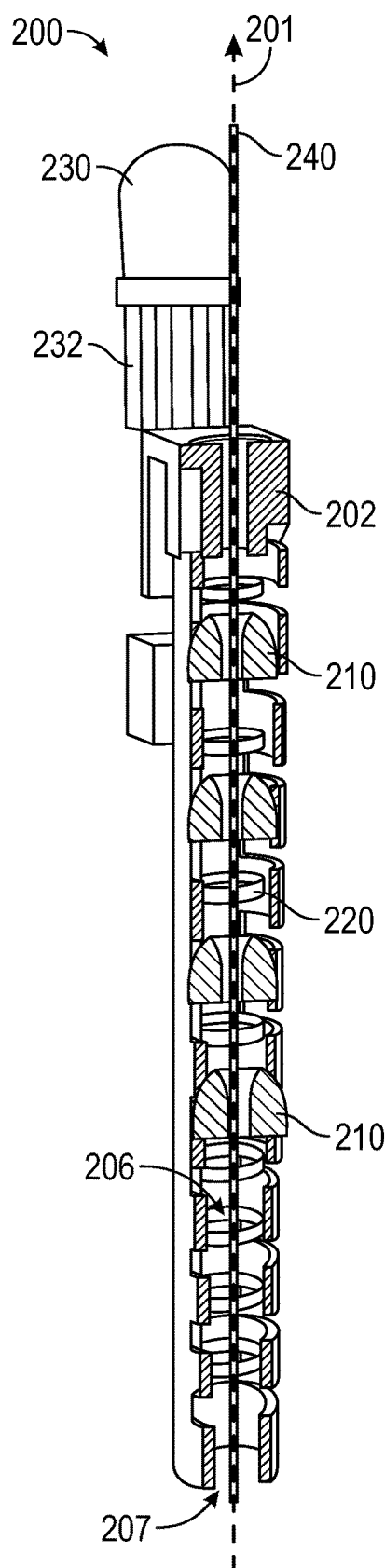
FIGS. 3 and 4 show a cross-sectional view and a side view, respectively, of a heater according to embodiments of the present disclosure.
Figure 4:
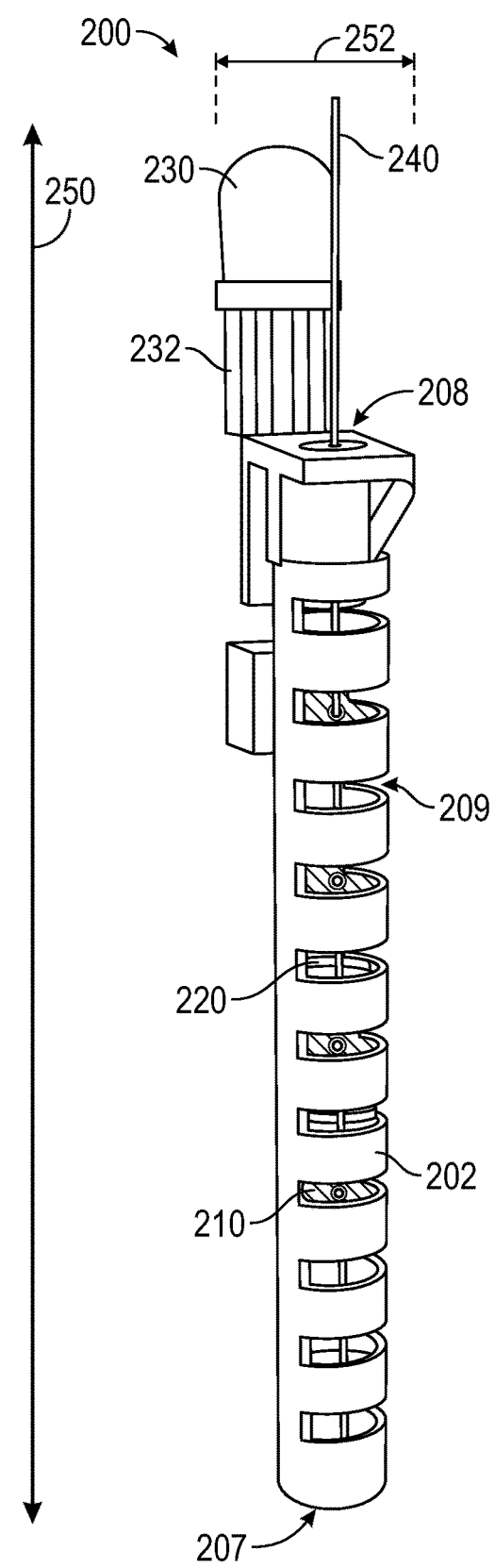

FIGS. 3 and 4 show a cross-sectional view and a side view, respectively, of an example of a heater 200 according to embodiments of the present disclosure. The heater 200 may have a housing 202, which may hold the components of the heater 200. A housing 202 may be formed of a heat resistant material, such as polymer or polymer composite with a low thermal conductivity (e.g., lower than 0.1 W/mK), Nylon, ABS, polymethyl methacrylate ("PMMA"), or other materials with high thermal resistance, for example. The housing 202 may have different sizes and shapes capable of holding the components of the heater 200, including a moisture collector 210 and a heating element 220, in an axially stacked and spaced apart configuration. For example, the housing 202 may have a generally cylindrical shape or other tubular shape, where heating element 220 and moisture collector 210 components may be arranged along an interior longitudinal axis 201 of the housing 202.

The heater 200 may further include a filament path 206 extending from a filament inlet 207 provided at a first axial end of the housing 202, through the heating element 220 and moisture collector 210 components of the heater 200, and to a filament outlet 208 at a second axial end of the housing 202, opposite the first axial end. A filament path 206 may be provided, for example, coaxially with a central longitudinal axis 201 of the heater 200 or may extend along an off-center longitudinal axis of the heater 200. A filament 240 may be moved in an axially coaligned manner through the filament path 206. As the filament 240 moves through the filament path 206 in the heater 200, the heating element(s) 220 within the heater 200 may heat the filament 240, and the moisture collector(s) 210 may wipe and/or absorb moisture condensed around the filament 240 from the heating.

According to some embodiments, a heating element 220 may be formed of an electric heating element, such as a resistance heating element, where electrical energy may be supplied to the heating elements 220 to generate heat from the heating element 220. An energy source 230 may be connected to one or more heating element(s) 220 via one or more electric heating cables 232. The energy source 230 may be provided with the heater 200, e.g., inside part of the housing 202, or separate from but connected to the housing 202. An energy source 210 may include, for example, a battery, an electrical circuit, or other power source. In some embodiments, an energy source may be connected to a plug, which may retrieve electrical power through an electrical outlet.

Figure 6:
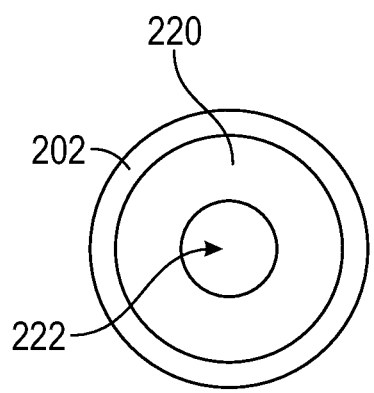
FIG. 6 shows a top view of a heating element mounted to a housing according to embodiments of the present disclosure.
Figure 7:
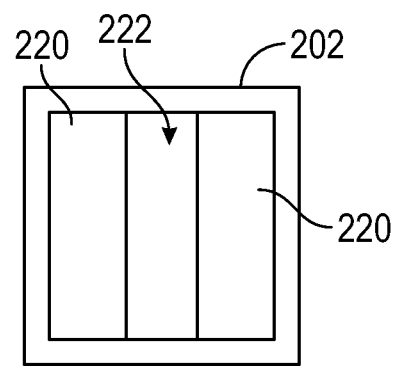
FIG. 7 shows a top view of heating elements mounted to a housing according to embodiments of the present disclosure.

Heating elements 220 may have various sizes and shapes and may be positioned along an interior wall of the housing 202 in a manner that allows a filament path 206 (a path through which a filament may travel) to be formed through the heating elements 220. For example, heating elements 220 may be held along an interior wall of the housing 202 in a configuration that provides a space in the interior of the housing and adjacent the heating elements 220, such that a filament may be directed through the space to travel past the heating elements 220 within the housing 202. Different examples of configurations for heating elements 220 held within a housing 202 are shown in FIGS. 5-7.

Figure 5:
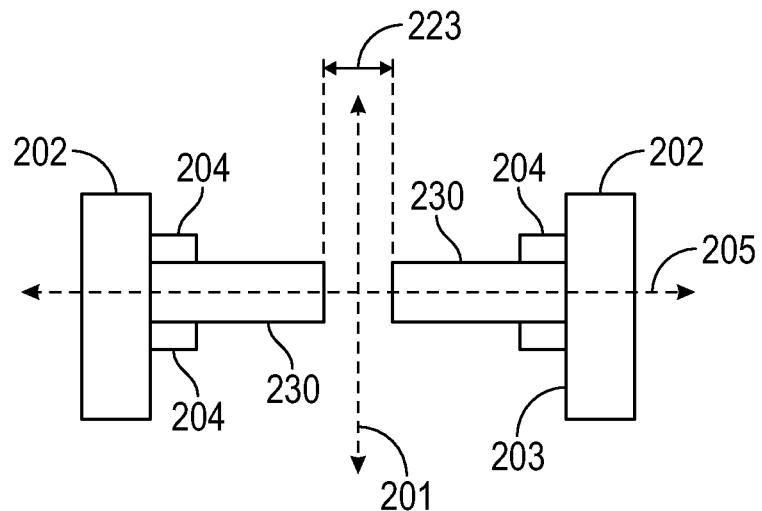
FIG. 5 shows a cross-sectional view of a heating element mounted to a housing according to embodiments of the present disclosure.

FIG. 5 shows a side cross-sectional view (a cross-section taken along a central longitudinal axis 201) of a portion of a housing 202 holding a heating element 220 according to embodiments of the present disclosure. The heating element 220 may be mounted to an interior wall 203 of the housing 202, for example, using brackets 204, clamps, interlocking features, fastening mechanisms, or other connection type. The heating element 220 may be arranged within the housing 202 to provide a space 222 in the interior of the housing 202, through which a filament may be run (as part of a filament path 206 through the heater 200).

The space 222 formed between heating element 220 may have a minimum diameter 223 (as measured along the smallest dimension of the space) that is greater than a diameter of a filament 240. In some embodiments, a minimum diameter 223 of a space 222 forming part of a filament path 206 between heating elements 220 may be at least 10 percent greater than the diameter of a filament 240 to reduce the likelihood of contact between the filament 240 and the heating element 220.

Depending on the shape and size of the heating elements 220 and the housing 202, one or more heating elements 220 may be arranged along a radial plane 205 of the housing 202 and have a space 222 provided therebetween for a filament path 206. For example, as shown in FIG. 6, a single heating element 220 may be arranged along a radial plane of the housing 202 and have a space 222 provided therein that may form part of a filament path 206, or as shown in FIG. 7, multiple heating elements 220 may be arranged along a radial plane of the housing 202 and have a space 222 provided therebetween that may form part of a filament path 206. FIGS. 6 and 7 are both top cross-sectional views (along a cross-section perpendicular to the longitudinal axis 201) of a housing 202 holding heating element(s) 220 according to embodiments of the present disclosure.

In the embodiment shown in FIG. 6, a housing 202 may have a circular cross-sectional shape and may hold a ring-shaped heating element 220 within the housing 202. The ring heating element 220 may have a through-hole (providing space 222) formed through a thickness of the heating element 220. Other embodiments having a space 222 provided as a through-hole in a single heating element 220 may use heating elements having non-circular shapes (e.g., a rectangular frame shape, an elliptical annulus, a hollow shape with non-circular outer perimeter and circular inner through-hole, a hollow shape with a circular outer perimeter and a non-circular inner through-hole, or others).

In the embodiment shown in FIG. 7, a housing 202 may have a non-circular cross-sectional shape (e.g., a rectangular tube shape), which may rectangular shaped heating elements 220 mounted along the interior wall of the housing 202.

Other embodiments may include heating elements having non-rectangular shapes, including but not limited to arc shapes or irregular shapes. In some embodiments, a heating element 220 may be provided as a coil that spirals at least one turn around the interior of the housing 202, providing a space through the center of the coil.

According to embodiments of the present disclosure, heating elements may be formed of metal and/or ceramic materials. For example, when using resistance heating, a heating element may be formed of a thermally conductive and electrically resistant material composed of metals, ceramics, and/or cermets, such as nickel alloys (e.g., NiCr alloys or CuNi alloys), molybdenum alloys, tungsten alloys, graphite, silicon carbide, and $MoSi_2$. In some embodiments, when heating elements are heated using induction heating, the heating elements may be made of electrically conductive materials, such as brass, aluminum, copper or steel or semiconducting materials such as silicon carbide. In some embodiments, heating elements may be coated with a ceramic material capable of heating at a controlled temperature, e.g., SiC, AlN, c-BN, and BeO.

Heating elements may be heated to a temperature capable of evaporating moisture from around a filament being moved through a filament path 206 formed through the heating elements. For example, a heating element may be heated to a temperature ranging from about 60° C. to about 70° C. In some embodiments, the heating temperature of the heating elements may be selected to be less than the melting temperature of a filament being moved through the heating elements.

Referring again to FIGS. 3 and 4, as the filament 240 is moved through the heater 200 and heated by the heating elements 220, moisture around the filament 240 may evaporate to the surrounding environment and/or may accumulate around the outer surface of the filament 240. In some embodiments, the housing 202 may be designed to have one or more vents 209 (e.g., in the form of cut-outs or openings) formed through the housing wall, where evaporated moisture may escape through the vent(s) 209 formed through the housing. Moisture accumulated around the filament 240 may be removed from around the filament using one or more moisture collectors 210.

A moisture collector 210 may be configured to wipe and/or absorb moisture from around a filament being moved against the moisture collector 210. For example, a moisture collector may include a filament opening encircled by and defined by a wall of the moisture collector, where the filament 240 may be moved through the moisture collector 210 via the filament opening.

Figure 8:
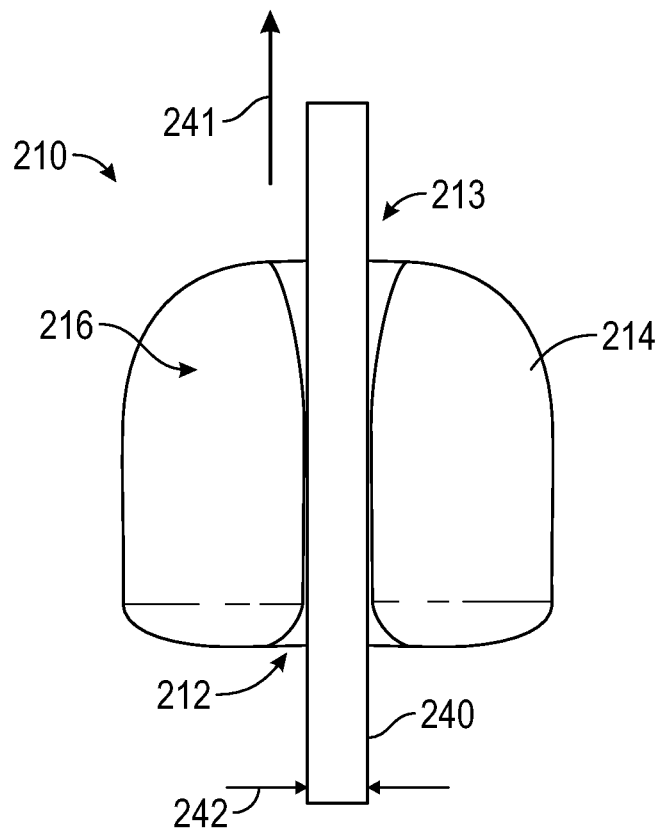
FIGS. 8-12 show cross-sectional views of various moisture collectors according to embodiments of the present disclosure.

For example, FIG. 8 shows a magnified view of a moisture collector 210 shown in the embodiment of FIGS. 3 and 4 having a filament 240 being moved through a portion of the filament path 206 formed through the moisture collector 210. In the embodiment shown, the moisture collector 210 may be formed of a wall 214 having a generally toroidal shape, where the central hole through the toroidal shape defines the portion of the filament path 206. The filament 240 may be moved through the moisture collector 210 in an axial direction 241 from a filament opening 212 at a first axial end of the moisture collector 210 to a filament exit 213 at an opposite second axial end of the moisture collector 210.

The filament opening 212, filament exit 213, and portion of filament path 206 extending between the filament opening 212 and exit 213 may have inner diameters that are greater than the diameter 242 of the filament 240 (e.g., greater by an amount that allows a filament to move smoothly through the inner diameters), but close enough to the filament diameter 242 to allow the filament to rub against the wall of the moisture collector 210, such that moisture accumulated around the filament 240 may be wiped off or absorbed by the moisture collector 210. For example, the filament opening 212, filament exit 213, and/or the portion of the filament path defined between the filament opening and exit may have an inner diameter that is greater than the filament diameter 242 by up to about 10 percent of the filament diameter 242. In such cases, when using commonly available filament sources, which may have diameters of 1.75 mm or 3.0 mm, an inner diameter of the moisture collector 210 may range from greater than 1.75 mm to about 1.93 mm when receiving filaments having a diameter of 1.75 mm, and may range from greater than 3.0 mm to about 3.3 mm when receiving filaments having a diameter of 3.0 mm.

In some embodiments, an inner wall portion of a moisture collector 210 defining a filament opening 212, a filament path 206, and/or a filament exit 213 may have different relative slopes or angles to ensure contact between a passing filament and the moisture collector 210.

According to embodiments of the present disclosure, the wall 214 of the moisture collector 210 may also define a moisture collection volume 216 extending at least around the filament opening 212 (e.g., extending circumferentially around the filament opening 212 and/or around the remaining portion of the filament path or filament exit 213). In some embodiments, the moisture collection volume 216 may be empty, and in some embodiments, a porous material (e.g., foam) may be held within the moisture collection volume 216. The moisture collection volume 216 may be used to collect moisture when it is wiped by the moisture collector 210.

Moisture collectors 210 may be formed of various types of materials capable of absorbing moisture (e.g., foam, ceramic based materials, compact sand, clays, etc.) and/or may have various shapes capable of wiping accumulated moisture away from a filament and/or collecting wiped away water. For example, the wall 214 of a moisture collector 210 may be formed of a foam or a porous ceramic material, which may both absorb moisture from a passing filament 240.

Figure 9:
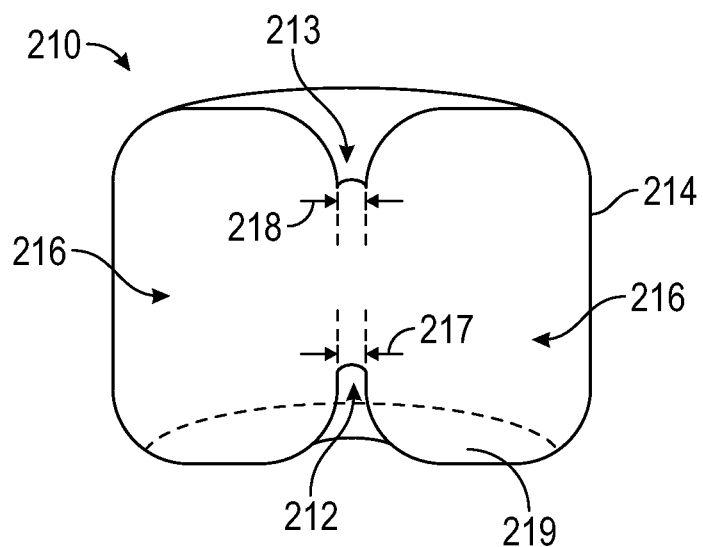

FIGS. 9-12 show additional examples of moisture collectors 210 according to embodiments of the present disclosure. For example, FIG. 9 shows a cross-section of an example of a moisture collector 210 having a wall 214 with a generally toroidal shape that defines interconnected moisture collection volumes 216. The wall 214 encircles and defines a filament opening 212 at a first axial end of the moisture collector and encircles and defines a filament exit 213 at an opposite second axial end of the moisture collector. A filament path may extend axially through the moisture collector from the filament opening 212 to the filament exit 213. The filament opening 212 and exit 213 may be designed to have inner diameters where an anticipated filament diameter is large enough to contact the filament opening 212 and exit 213 and small enough to slide through the filament opening 212 and exit 213. In the embodiment shown, the wall 214 does not enclose the filament path extending axially between the filament opening 212 and exit 213, but instead, the filament path may be open to the moisture collection volume 216. In such embodiments, as a filament is moved through the filament path, moisture around the filament may be wiped by the filament opening 212 and exit 213 and collected in the moisture collection volume 216 (e.g., where the moisture may be held in a bottom cup-like portion 219 of the moisture collector 210.

Figure 10:
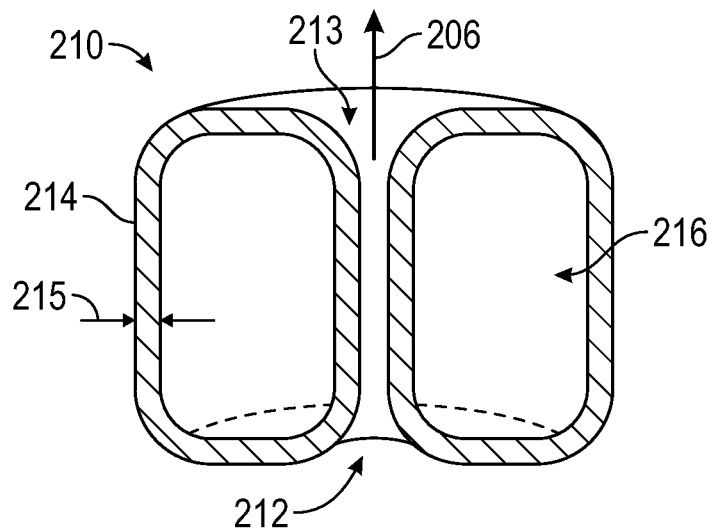

FIG. 10 shows a cross-sectional view of another example of a moisture collector 210 according to embodiments of the present disclosure, where the moisture collector 210 has a wall 214 with a generally toroidal shape (e.g., donut-shape) that defines and circumferentially encloses a filament path 206 extending through the moisture collector 210 from a filament opening 212 to a filament exit 213 (where an inner portion of the wall may circumferentially enclose the filament path 206). The wall 214 may also entirely enclose a moisture collection volume 216, which may be used to collect moisture absorbed through the wall 214 of the moisture collector. The thickness 215 of the wall 214 may be designed, for example, based on the material of the wall and the material's absorbency and effective porosity (the ratio of the volume of pores within the material that is accessible from the exterior to the bulk volume of material). For example, materials having a relatively higher effective porosity may be used to form relatively thicker walls of a moisture collector.

Figure 11:
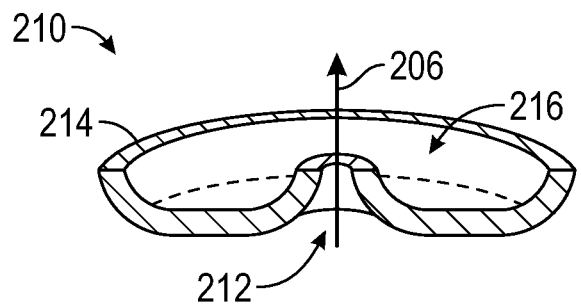

FIG. 11 shows a cross-sectional view of another example of a moisture collector 210 according to embodiments of the present disclosure. The wall 214 of the moisture collector may have a generally U-shaped cross-section when viewed along a radial cross-sectional plane, which when rotated about a rotational axis, may form a bundt shape. The wall 214 may encircle and define a filament opening 212, through which a filament may pass. Additionally, the U-shape of the wall 214 may define a moisture collection volume 216. When a filament is moved along a filament path 206, the filament may pass through the filament opening 212, where moisture accumulated around the filament may be wiped away by the portion of the wall 214 forming the filament opening 212 and collected into the moisture collection volume 216.

Figure 12:
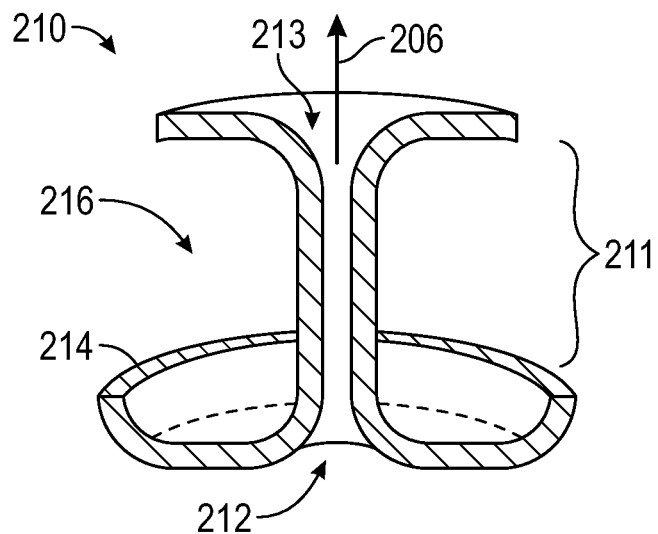

FIG. 12 shows a cross-sectional view of another example of a moisture collector 210 according to embodiments of the present disclosure, which may include a wall 214 defining both a filament path 206 extending axially through the moisture collector 210 and a moisture collection volume 216. An inner portion of the wall 214 encircles and defines the filament path 206, including a filament opening 212 and a filament exit 213. A bottom portion of the wall 214 may have a scoop geometry that may collect and hold moisture. Additionally, an opening 211 to the moisture collection volume 216 may be formed through an outer portion of the wall 214, which may allow moisture to vent out of or be removed from the moisture collection volume 216.

Other shapes and configurations of a moisture collector may be envisioned according to embodiments of the present disclosure where a filament path through the moisture collector is designed to contact a filament.

Moisture collectors and heating elements may be arranged in various patterns within a housing, such that when a filament is being run through the heater, one or more heating element may heat the filament prior to the filament moving through a moisture collector. For example, in some embodiments, multiple heating elements and moisture collectors may be alternatingly positioned in an axially spaced apart configuration along a longitudinal axis within a heater housing, where at least one heating element may be positioned proximate a filament inlet at a first axial end of the heater housing, and a moisture collector may be positioned axially interior to the heating element from the filament inlet.

Referring to FIGS. 3 and 4, according to embodiments of the present disclosure, at least one heating element 220 may be positioned proximate a filament inlet 207 at a first axial end of the heater housing 202. In the embodiment shown in FIGS. 3 and 4, multiple heating elements 220 may be grouped at the first axial end of the housing 202, in an axially spaced apart configuration along a longitudinal axis of the housing 202. When mounted in the housing 202, heating elements 220 may generally have a first axial side facing in a direction toward from the filament inlet 207 and an opposite second axial side facing in a direction away from the filament inlet 207. A moisture collector 210 may be positioned at the second axial side of at least one heating element 220, such that the heating element 220 is positioned axially between the filament inlet 207 and the moisture collector 210. For example, in the embodiment shown in FIGS. 3 and 4, a group of alternatingly positioned heating elements 220 and moisture collectors 210 may be held within the heater housing 202 axially interior to the group of heating elements 220 held proximate the filament inlet 207. Each moisture collector 210 may be positioned at (and spaced apart from) a second axial side of a heating element 220 facing in a direction away from the filament inlet 207, such that each moisture collector 210 may have at least one heating element 220 positioned between the moisture collector 210 and the filament inlet 207.

By providing one or more heating elements 220 at or near the filament inlet 207 to the heater 200, a filament 240 may initially be heated as it enters the heater 200, which may evaporate moisture from around the filament to be collected by a subsequently positioned moisture collector 210. Additionally, by providing heating element 220 and moisture collector 210 components in an axially spaced apart configuration (where heater components that are axially adjacent to each other have a space therebetween), moisture evaporated by the heating element(s) may have space to escape.

According to embodiments of the present disclosure, heating element 220 and moisture collector 210 components may be axially aligned along a longitudinal axis (either a central longitudinal axis 201 or an off-center longitudinal axis) of the heater housing 202, such that a filament path 206 may be formed longitudinally through the heater housing 202. For example, the heating element 220 and moisture collector 210 components may be axially aligned along a longitudinal axis such that a filament opening (e.g., 212 in FIGS. 8-12) of a moisture collector 210 and a space (e.g., 222 in FIGS. 6-7) formed through a heating element 220 may be axially aligned with each other and with a filament inlet 207 to the heater 200. In some embodiments, a diameter of the space formed through a heating element (e.g., the diameter of a through-hole in a ring heating element) may be greater than an inner diameter of the filament opening formed through a moisture collector 210, such that a passing filament 240 may not contact the heating element 220 and may contact the moisture collector 210.

By designing filament heaters according to embodiments of the present disclosure (e.g., heaters having multiple heating element and moisture collector components held in an axially spaced apart configuration along a longitudinal axis within a housing and a filament path extending along the longitudinal axis of the housing and through the multiple heating element and moisture collector components), heaters may effectively dehumidify filaments while also having a compact enough size to be positioned almost anywhere along the path of a filament from the filament source (e.g., a filament spool) to the printer head of a 3D printer. For example, the close and directed positioning of heating elements in a heater around a passing filament may allow for the filament to be quickly heated and have immediately surrounding moisture evaporated. By providing at least one moisture collector according to embodiments of the present disclosure (e.g., capable of wiping and absorbing moisture using a relatively small amount of porous material) within the heater and proximate the heating element(s), accumulated moisture may also be immediately wiped or absorbed away, thereby inhibiting evaporated moisture from staying on the filament. Additionally, by providing venting spaces around the heating element(s) and moisture collector(s) (e.g., vents through the heater housing and spaces between adjacent heating elements and moisture collectors), evaporated moisture may escape the heater, thereby inhibiting evaporated moisture from staying on the filament. When using design features disclosed herein together to design a filament heater, the overall size of the heater may be small enough to be directly mounted onto a wall or frame of a 3D printer. For example, referring to FIGS. 3 and 4, in some embodiments, a heater 200 according to embodiments of the present disclosure may have an overall height 250 (measured along the heater's longitudinal axis 201) ranging from greater than 30 mm to about 10 cm and an overall width 252 (measured along a plane perpendicular to the longitudinal axis 201) ranging from about greater than 8 mm to about 50 mm. According to embodiments of the present disclosure, the overall height 250 of a heater 200 may be based on the distance between the heater 200 and the extruder of a printer on which the heater is mounted, where a longer heater 200 or multiple heaters 200 may be provided when mounted at relatively longer distances to the extruder.

A heater according to embodiments of the present disclosure may be provided on a body of a 3D printer, such as mounted on a sidewall or frame of the 3D printer. A filament may be moved through the filament path formed through the heater, where the filament may be heated with the heating elements within the heater to a temperature less than a melting temperature of the filament to provide a heated filament. Moisture accumulated from the heated filament may be wiped or absorbed away from the filament using the moisture collector(s) within the heater. The heated and dehumidified filament may then be directed to a printer head of the 3D printer. According to embodiments of the present disclosure, the heater may be positioned as close to the printer head as possible to minimize the exposure of the filament to the surroundings after being dehumidified in the heater. If a filament is dehumidified too far away from the 3D printer (e.g., located a distance away from the 3D printer), the filament may reabsorb humidity by the time it reaches the printer head.

By using a heater according to embodiments of the present to dehumidify a filament immediately prior to being extruded through a printer head of a 3D printer (e.g., by passing the filament through the heater along a path between the filament source and the printer head), the filament may be extruded and 3D printed with a reduced amount of moisture, which may reduce adhesive issues and breakage commonly found in 3D printed objects without such humidity reduction. Such humidity reduction (and corresponding reduction in adhesive issues and breakage) may allow for the 3D printing of more complex and/or quality components, such as tools.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed:

1. A 3D printer, comprising:
   a printer body;
   a printer head movably held within the printer body;
   a filament source;
   a filament extending from the filament source to the printer head; and
   a heating device disposed around the filament, the heating device comprising:
      a housing;
      a heating element positioned along an interior wall of the housing, the heating element comprising a through-hole formed through a thickness of the heating element;
      a moisture collector held within the housing, wherein the moisture collector comprises a wall encircling and defining a filament opening; and
      a filament path extending along a longitudinal axis of the housing, formed through the moisture collector and the heating element;
      wherein the heating element and the moisture collector are held in an axially stacked configuration along the longitudinal axis of the housing,
      wherein the through-hole of the heating element comprises a diameter greater than an inner diameter of the filament opening, and
      wherein the filament extends through the filament path, contacting the filament opening in the moisture collector.

2. The 3D printer of claim 1, wherein the heating device further comprises an energy source connected to the housing, wherein the heating element is connected to the energy source via an electric heating cable.

3. The 3D printer of claim 1, wherein the heating element has a ring shape comprising a through-hole formed through a thickness of the heating element, and wherein the through-hole forms part of the filament path.

4. The 3D printer of claim 3, wherein a diameter of the through-hole is greater than an inner diameter of the filament opening.

5. The 3D printer of claim 1, wherein the heating device further comprises additional heating elements held in the axially stacked configuration along the longitudinal axis of the housing, wherein the additional heating elements are grouped at a first axial end of the housing.

6. The 3D printer of claim 1, wherein the filament path comprises:
   a filament inlet at a first axial end of the housing; and
   a filament outlet at a second axial end of the housing, opposite the first axial end;
   wherein the heating element is positioned axially between the moisture collector and the filament inlet.

7. The 3D printer of claim 1, wherein the filament opening has an inner diameter that is greater than a filament diameter of the filament by up to 10 percent of the filament diameter.

8. The 3D printer of claim 1, wherein the heating element is heated to a temperature less than a melting temperature of the filament.

9. The 3D printer of claim 1, wherein the moisture collector comprises a porous material held within a moisture collection volume defined by the wall of the moisture collector.

10. A 3D printer comprising:
- a filament extending from a filament source to a printer head; and
- a heating device disposed around the filament, the heating device comprising:
  - a heating element positioned along an interior wall of a housing of the heating device, the heating element comprising a through-hole formed through a thickness of the heating element;
  - a moisture collector held within the housing, the moisture collector comprising a wall encircling and defining a filament opening; and
  - a filament path extending along a longitudinal axis of the housing, formed through the moisture collector and the heating element;
- wherein the heating element and the moisture collector are stacked along the longitudinal axis in an axially spaced apart configuration,
- wherein the through-hole of the heating element comprises a diameter greater than an inner diameter of the filament opening,
- wherein the heating device further comprises additional heating elements and additional moisture collectors alternatingly positioned in the axially spaced apart configuration and held within the housing, and
- wherein the filament extends through the filament path, contacting the filament opening in the moisture collector.

* * * * *